US007616278B2

(12) United States Patent
Tsai et al.

(10) Patent No.: US 7,616,278 B2
(45) Date of Patent: Nov. 10, 2009

(54) LIQUID CRYSTAL DISPLAYS

(75) Inventors: Chia-Yi Tsai, Luodong Township (TW); Li-Sen Chuang, Husi Township (TW); Yih-Jun Wong, Tainan (TW)

(73) Assignee: TPO Displays Corp., Chu-Nan (TW)

( * ) Notice: Subject to any disclaimer, the term of this patent is extended or adjusted under 35 U.S.C. 154(b) by 210 days.

(21) Appl. No.: 11/294,866

(22) Filed: Dec. 5, 2005

(65) Prior Publication Data

US 2007/0126961 A1 Jun. 7, 2007

(51) Int. Cl.
*G02F 1/1335* (2006.01)

(52) U.S. Cl. .................. 349/119; 349/117; 349/118

(58) Field of Classification Search .......... 349/117–119
See application file for complete search history.

(56) References Cited

U.S. PATENT DOCUMENTS

| 4,909,603 | A | | 3/1990 | Taniguchi |
|---|---|---|---|---|
| 5,291,323 | A | * | 3/1994 | Ohnishi et al. ............... 349/120 |
| 5,410,422 | A | | 4/1995 | Bos |
| 5,504,603 | A | * | 4/1996 | Winker et al. ............... 349/117 |
| 5,583,678 | A | | 12/1996 | Nishino et al. |
| 5,777,709 | A | * | 7/1998 | Xu .............................. 349/120 |
| 5,859,681 | A | * | 1/1999 | VanderPloeg et al. ....... 349/120 |
| 5,895,106 | A | * | 4/1999 | VanderPloeg et al. ....... 349/120 |
| 6,055,033 | A | | 4/2000 | Yamaguchi et al. |
| 6,493,053 | B1 | * | 12/2002 | Miyachi et al. ............. 349/117 |
| 6,919,946 | B2 | | 7/2005 | Allen et al. |
| 7,110,073 | B2 | * | 9/2006 | Hsu et al. .................... 349/119 |
| 7,298,441 | B2 | * | 11/2007 | Yang et al. .................. 349/114 |
| 2003/0071946 | A1 | * | 4/2003 | Hirota et al. ................ 349/117 |
| 2004/0233348 | A1 | | 11/2004 | Mai |
| 2005/0162592 | A1 | * | 7/2005 | Hirakata et al. ............. 349/119 |
| 2005/0190328 | A1 | * | 9/2005 | Sekime ....................... 349/119 |
| 2005/0195344 | A1 | | 9/2005 | Chang et al. |
| 2005/0225706 | A1 | * | 10/2005 | Miyachi et al. ............. 349/117 |
| 2005/0275779 | A1 | * | 12/2005 | Nanno ......................... 349/117 |
| 2006/0007376 | A1 | * | 1/2006 | Fukuda et al. .............. 349/119 |
| 2006/0061709 | A1 | | 3/2006 | Lin |
| 2006/0061718 | A1 | * | 3/2006 | Shibasaki et al. ........... 349/119 |
| 2006/0209239 | A1 | | 9/2006 | Lin |
| 2008/0024703 | A1 | * | 1/2008 | Ichihashi .................... 349/119 |

FOREIGN PATENT DOCUMENTS

| CN | 1475847 | 2/2004 |
|---|---|---|
| WO | 2004042461 | 5/2004 |

* cited by examiner

*Primary Examiner*—David Nelms
*Assistant Examiner*—Thanh-Nhan P Nguyen
(74) *Attorney, Agent, or Firm*—Liu & Liu

(57) ABSTRACT

Systems for displaying images are provided. A representative system comprises a wide viewing angle liquid crystal display with multi-film compensation. A liquid crystal display comprising a first substrate, a second substrate, and a liquid crystal layer sandwiched between the first substrate and the second substrate. A first compensation film is interposed between the first polarizer and the first substrate. A second compensation film interposed between the second polarizer and the second substrate. The first compensation film and the second compensation film comprise different birefringence polarities.

20 Claims, 9 Drawing Sheets

Equal contrast ratio contour

LIQUID CRYSTAL DISPLAYS

BACKGROUND

The invention relates to liquid crystal displays.

Liquid crystal displays (LCDs) are widely used in information displays. Due to the intrinsic optical anisotropy of liquid crystal display materials, the incident light that transmit from different directions can produce different effective birefringence. Therefore, the viewing angle of conventional LCDs is not as wide as in self-luminescent displays, such as cathode-ray tubes (CRTs), organic light-emitting diodes (OLEDs) and plasma display panels (PDPs).

In order to widen the viewing angle, several display modes using lateral electric field to activate the LC molecules, such as in-plane switching (IPS) mode and fringe field switching (FFS) mode have been proposed. In both IPS and FFS modes, the LC molecules at voltage-off state are basically homogeneously aligned on the glass or plastic substrates that are coated with a thin indium-tin-oxide (ITO) layer and then overcoated with a polyimide alignment layer. The surfaces of the polyimide layers are rubbed in an anti-parallel direction to create homogeneous alignment. The display panel is sandwiched between two crossed polarizers, and the long axis of LC molecules is either parallel or perpendicular to the transmission direction of their adjacent polarizers. At on-state, these LC molecules can twist in the plane parallel to the supporting substrates by the lateral electric field generated from the comb-shaped electrodes.

Light efficiency is proportional to the total retardation change experienced by the incident light traveling in the liquid crystal layer of the device. The total retardation change is a product of 1) birefringence $\Delta n$, of the liquid crystal molecules and 2) total path length traveled by the incident light in the liquid crystal layer. FIG. 1 is a schematic view of a conventional multi-film compensated liquid crystal display. In FIG. 1, a liquid crystal display 1 comprises a first substrate 10, a second substrate 20, and a liquid crystal layer 30 sandwiched between the first substrate 10 and the second substrate 20. A first polarizer 40 is laminated outside the first substrate 10 opposing the liquid crystal layer 30. A second polarizer 50 is laminated outside the second substrate 20 opposing the liquid crystal layer 30. A first birefringence compensation film 15 is interposed between the first polarizer 40 and the first substrate 10. A second birefringence compensation film 25 is interposed between the second polarizer 50 and the second substrate 20.

Conventional transflective liquid crystal display uses a single compensation film to compensate the birefringence of the liquid crystal layer. Alternatively, some liquid crystal displays use two compensation films with the same birefringence polarity to compensate the birefringence of the liquid crystal layer.

FIG. 2A is a schematic view of a conventional compensation film with negative birefringence polarity ($\Delta n<0$). The compensation film with negative birefringence polarity ($\Delta n<0$) comprises disk-like liquid crystal molecules 22. FIG. 2B is a schematic view of a conventional compensation film with positive birefringence polarity ($\Delta n>0$). The compensation film with positive birefringence polarity ($\Delta n>0$) comprises rod-like liquid crystal molecules 24. Conventional compensated liquid crystal uses the same birefringence polarity films to compensate the birefringence of the liquid crystal layer. Since the first compensated film and the second compensated film have same birefringence polarities, the birefringence therebetween cannot be compensated, causing a narrow viewing angle in normally white displays.

SUMMARY

Systems for displaying images are provided. An embodiment of such a system comprises a liquid crystal display. The liquid crystal display comprising a first substrate, a second substrate, and a liquid crystal layer sandwiched between the first substrate and the second substrate. A first compensation film is interposed between the first polarizer and the first substrate. A second compensation film interposed between the second polarizer and the second substrate. The first compensation film and the second compensation film comprise different birefringence polarities.

Another embodiment of such a system comprises a liquid crystal display, comprising a first substrate, a second substrate, and a liquid crystal layer sandwiched between the first substrate and the second substrate. A first polarizer is laminated outside the first substrate opposing the liquid crystal layer. A second polarizer is laminated outside the second substrate opposing the liquid crystal layer. A negative birefringence compensation film is interposed between the first polarizer and the first substrate. A positive birefringence compensation film is interposed between the second polarizer and the second substrate. A ¼λ compensation film and a first ½λ compensation film are interposed between the first polarizer and the negative birefringence compensation film. A second ½λ compensation film is interposed between the second polarizer and the positive birefringence compensation film.

Another embodiment of such a system comprises a liquid crystal display, comprising a first substrate, a second substrate, and a liquid crystal layer sandwiched between the first substrate and the second substrate. A first polarizer is laminated outside the first substrate opposing the liquid crystal layer. A second polarizer is laminated outside the second substrate opposing the liquid crystal layer. A positive birefringence compensation film is interposed between the first polarizer and the first substrate. A negative birefringence compensation film is interposed between the second polarizer and the second substrate. A ¼λ compensation film and a second ½λ compensation film are interposed between the second polarizer and the negative birefringence compensation film. A first ½λ compensation film is interposed between the first polarizer and the positive birefringence compensation film.

DESCRIPTION OF THE DRAWINGS

The invention will become more fully understood from the detailed description given hereinbelow and the accompanying drawings, given by way of illustration only and thus not intended to be limited.

DETAILED DESCRIPTION

Before explaining the disclosed invention in detail, it is to be understood that the invention is not limited in its application to the details of the particular arrangements shown since the invention is capable of other embodiments. Also, the terminology used herein is for the purpose of description and not limitation.

Systems for displaying images are provided that can solve the light leakage problem of normally white displays, thereby yielding a wider viewing angle. In some embodiments, such a system incorporates a display with two different polarity compensation films. Several examples or embodiments will now be described.

Figure 1:
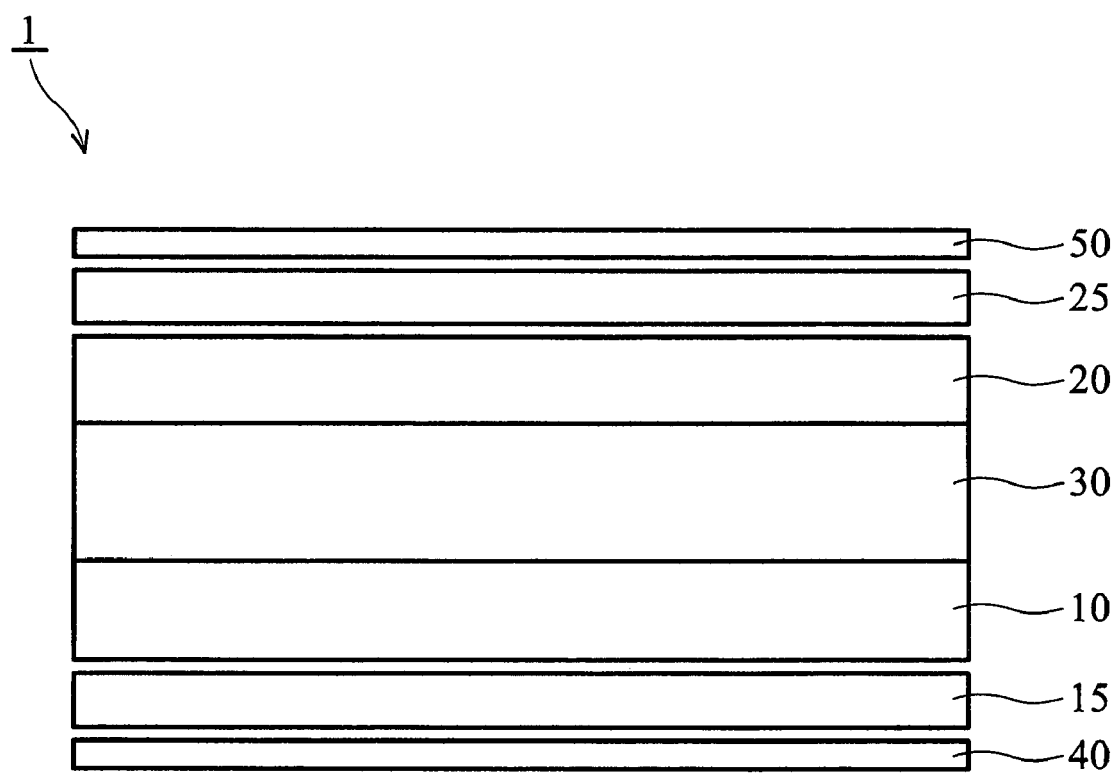
FIG. 1 is a schematic view of a conventional multi-film compensated liquid crystal display.
Figure 2A:
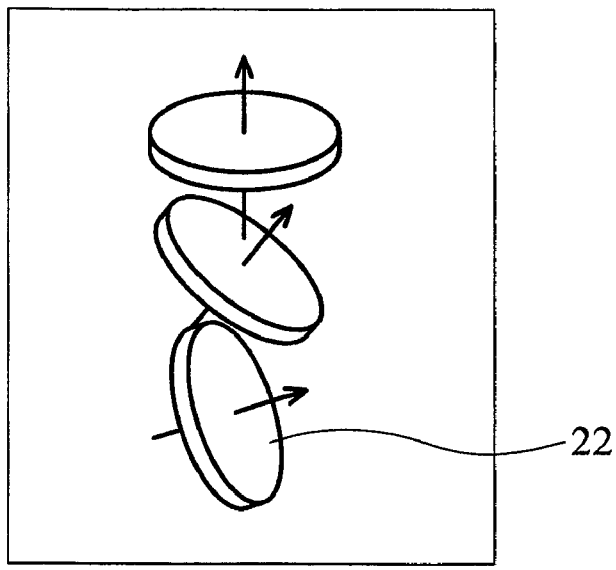
FIG. 2A is a schematic view of a conventional compensation film with negative birefringence polarity ($\Delta n<0$)
Figure 2B:
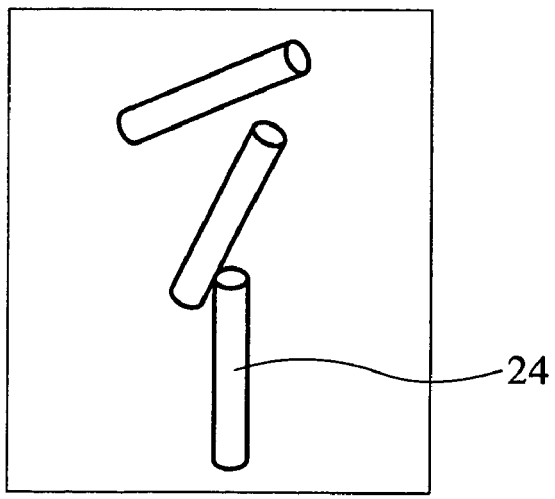
FIG. 2B is a schematic view of a conventional compensation film with positive birefringence polarity ($\Delta n>0$)
Figure 3A:
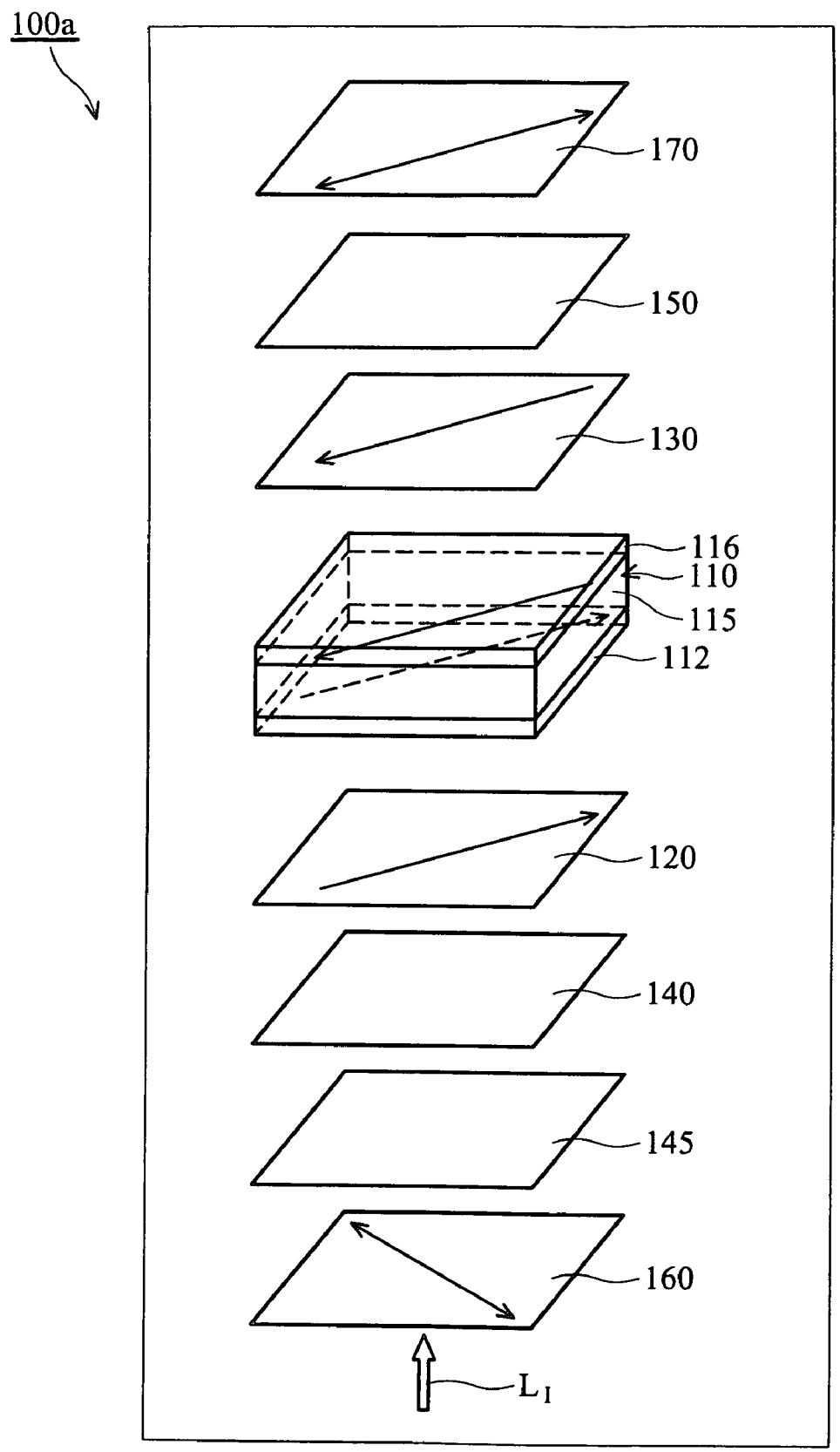
FIG. 3A is a schematic view of an embodiment of a multi-film compensated liquid crystal display.

FIG. 3A is an explosive view of an embodiment of a multi-film compensated liquid crystal display. A liquid crystal display 100a comprises liquid crystal display panel 110 with a first substrate 112, a second substrate 116, and a liquid crystal layer 115 sandwiched between the first substrate and the second substrate. A first polarizer 160 is laminated outside the liquid crystal display panel 110. A second polarizer 170 is laminated outside the liquid crystal display panel 110. A negative birefringence compensation film 120 is interposed between the first polarizer 160 and the liquid crystal display panel 110. A positive birefringence compensation film 130 is interposed between second polarizer 170 and liquid crystal display panel 110. A ¼λ compensation film 140 and a ½λ compensation film 145 are interposed between the first polarizer 160 and the negative birefringence compensation film 120. A ½λ compensation film 150 is interposed between the second polarizer 170 and the positive birefringence compensation film 130.

The liquid crystal display 100a can be a transmissive liquid crystal display with two different polarity compensation films. The two different polarity compensation films can compensate each other. The incident light $L_I$, such as, from a backlight passes through the first polarizer 160, the ½λ compensation film 145, the ¼λ compensation film 140, the negative birefringence compensation film 120, the liquid crystal display panel 110, the positive birefringence compensation film 130, the ½λ compensation film 150, and the second polarizer 170 to an observer. The liquid crystal layer 115 comprises an electrical control birefringence (ECB) liquid crystal, or twisted nematic liquid crystal. The liquid crystal display panel 110 further comprises two alignment layers (not shown) at the interface between liquid crystal layer 115 and the first substrate 112 and the interface between liquid crystal layer 115 and the second substrate 112. LC molecules are aligned at the alignment layers with continuous pre-tilted angles in a range approximately from 5° to 10°. The cell gap of the liquid crystal layer is preferably about 4.15 μm.

The first compensation film, such as a compensation film with a negative birefringence polarity (Δn<0), can comprise disk-like liquid crystal molecules 125. The negative compensation film (Δn<0) may preferably comprise optical axis angles in a range approximately from 24° to 79°. The second compensation film, such as a compensation film with positive birefringence polarity (Δn>0), can comprise rod-like liquid crystal molecules 135. The positive compensation film (Δn>0) may preferably comprise optical axis angles in a range from 2° to 52° approximately.

Figure 3B:
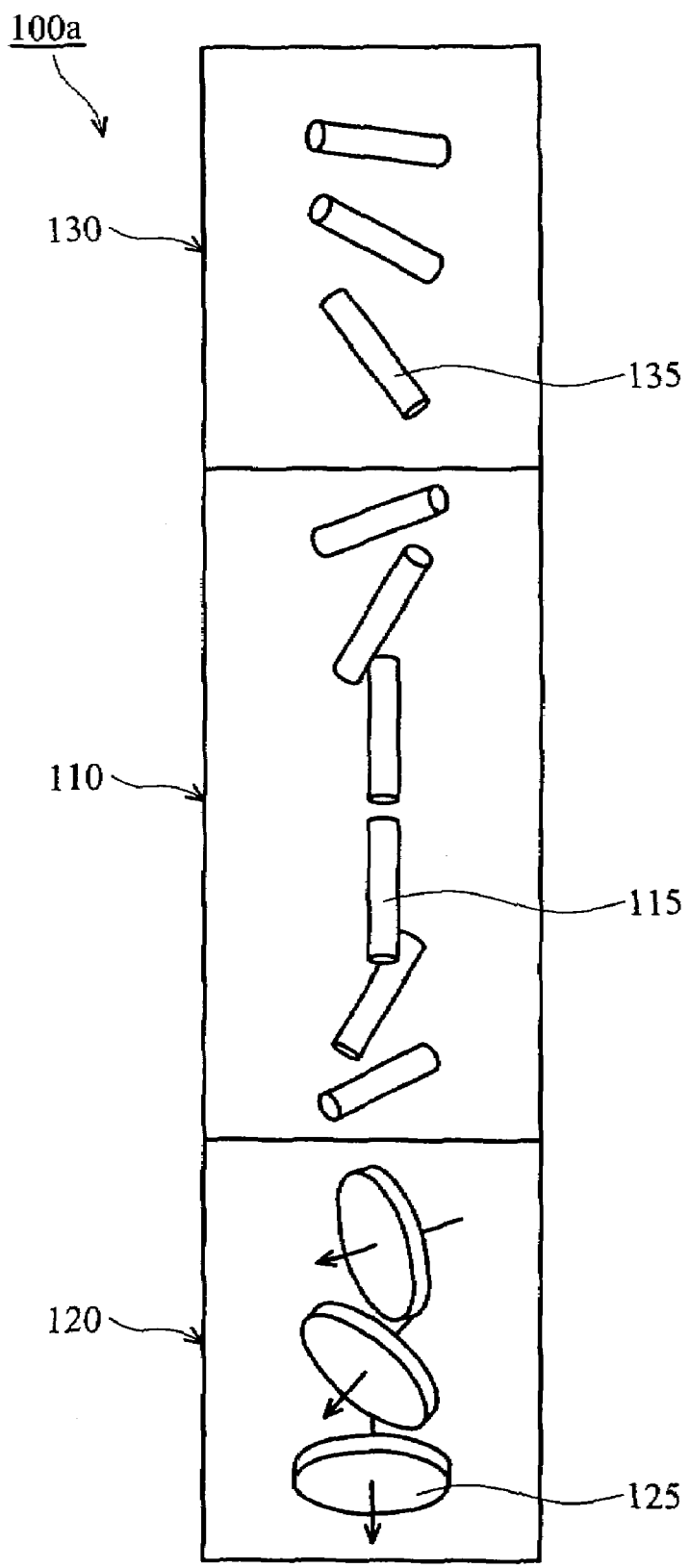
FIG. 3B is a schematic view showing the polarity relationship between compensation films and the liquid crystal layer.

FIG. 3B is a schematic view showing the polarity relationship between compensation films and the liquid crystal layer. The compensated liquid crystal display 110a uses different birefringence polarity films 120 and 130 to compensate for the birefringence of liquid crystal display panel 110. The negative compensated film 130 and the positive compensated film 120 have different birefringence polarities, the birefringence therebetween can therefore be compensated, thereby widening the viewing angle of a normally white display.

Figure 4A:
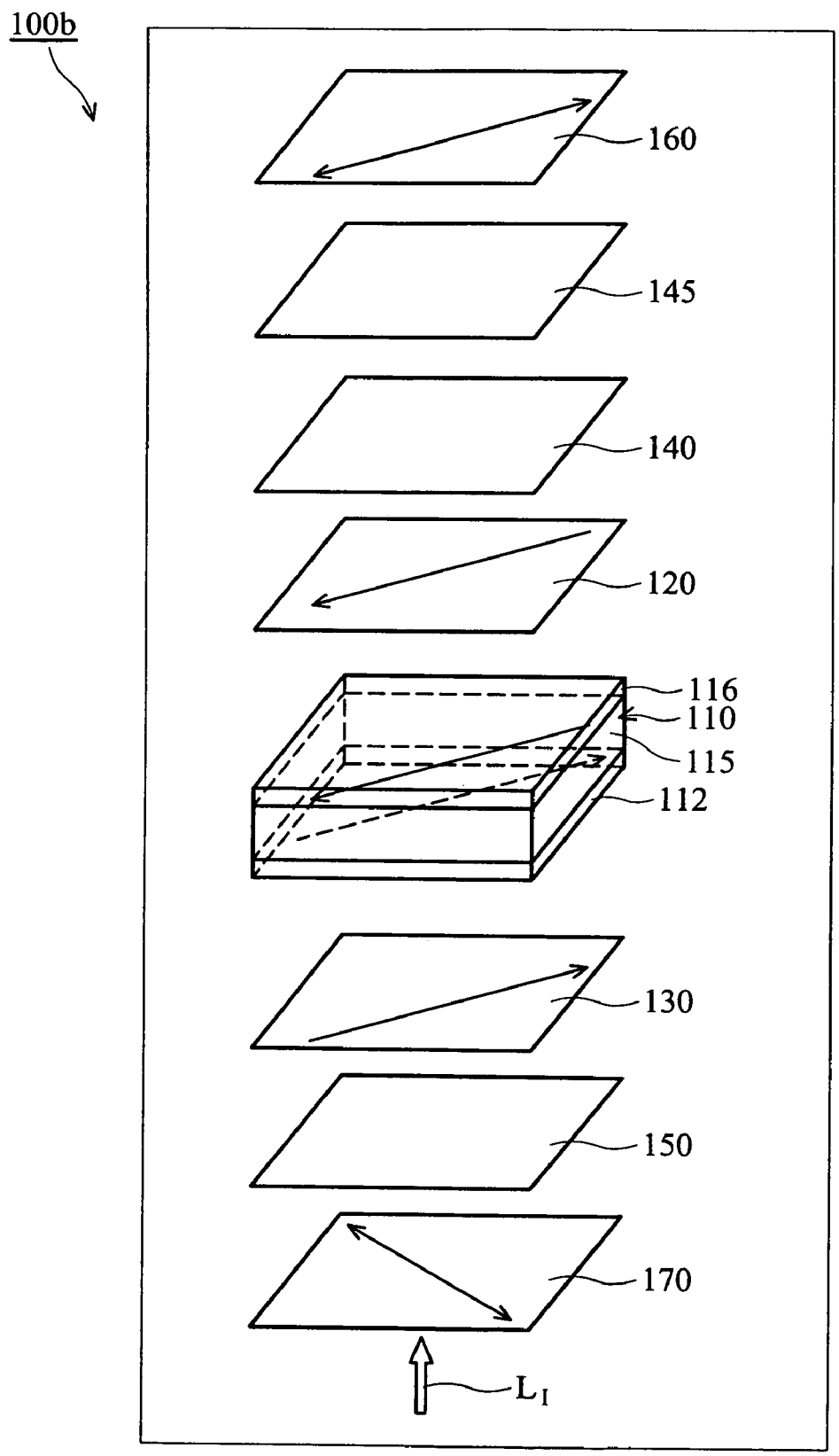
FIG. 4A is a schematic view of another embodiment of a multi-film compensated liquid crystal display.

FIG. 4A is an exploded view of another embodiment of a multi-film compensated liquid crystal display. A liquid crystal display 100b comprises a display panel 110 with a first substrate 112, a second substrate 116, and a liquid crystal layer 115 sandwiched between the first substrate 112 and the second substrate 116. A first polarizer 170 is laminated outside the liquid crystal display panel 110. A second polarizer 160 is laminated outside the liquid crystal display panel 110. A positive birefringence compensation film 130 is interposed between the first polarizer 170 and the liquid crystal display panel 110. A negative birefringence compensation film 120 is interposed between the second polarizer 160 and the liquid crystal display panel 110. A ¼λ compensation film 140 and a ½λ compensation film 145 are interposed between the second polarizer 160 and the negative birefringence compensation film 120. A ½λ compensation film 150 is interposed between the first polarizer 170 and the positive birefringence compensation film 130.

The liquid crystal display 100b can be a transmissive liquid crystal display with two different polarity compensation films. The two different polarity compensation films can compensate each other. The incident light $L_I$ such as from a backlight passes through the first polarizer 160, the ½λ compensation film 150, the positive birefringence compensation film 130, the liquid crystal display panel 110, the negative birefringence compensation film 120, the ¼λ compensation film 140, the ½λ compensation film 145, and the second polarizer 170 to an observer. The liquid crystal layer comprises an electrical control birefringence (ECB) liquid crystal, or twisted nematic liquid crystal. The liquid crystal display panel 110 further comprises two alignment layers (not shown) at the interface between liquid crystal layer 115 and the first substrate 112 and the interface between liquid crystal layer 115 and the second substrate 116. LC molecules are aligned at the alignment layers with continuous pre-tilted angles in a range from 5° to 10° approximately. The cell gap of the liquid crystal layer is preferably about 4.15 μm.

The first compensation film, such as a compensation film with a negative birefringence polarity (Δn<0), can comprise disk-like liquid crystal molecules 125. The negative compensation film (Δn<0) may preferably comprise optical axis angles in a range from 24° to 79° approximately. The second compensation film, such as a compensation film with positive birefringence polarity (Δn>0), can comprise rod-like liquid crystal molecules 135. The positive compensation film (Δn>0) may preferably comprise optical axis angles in a range from 2° to 52° approximately.

Figure 4B:
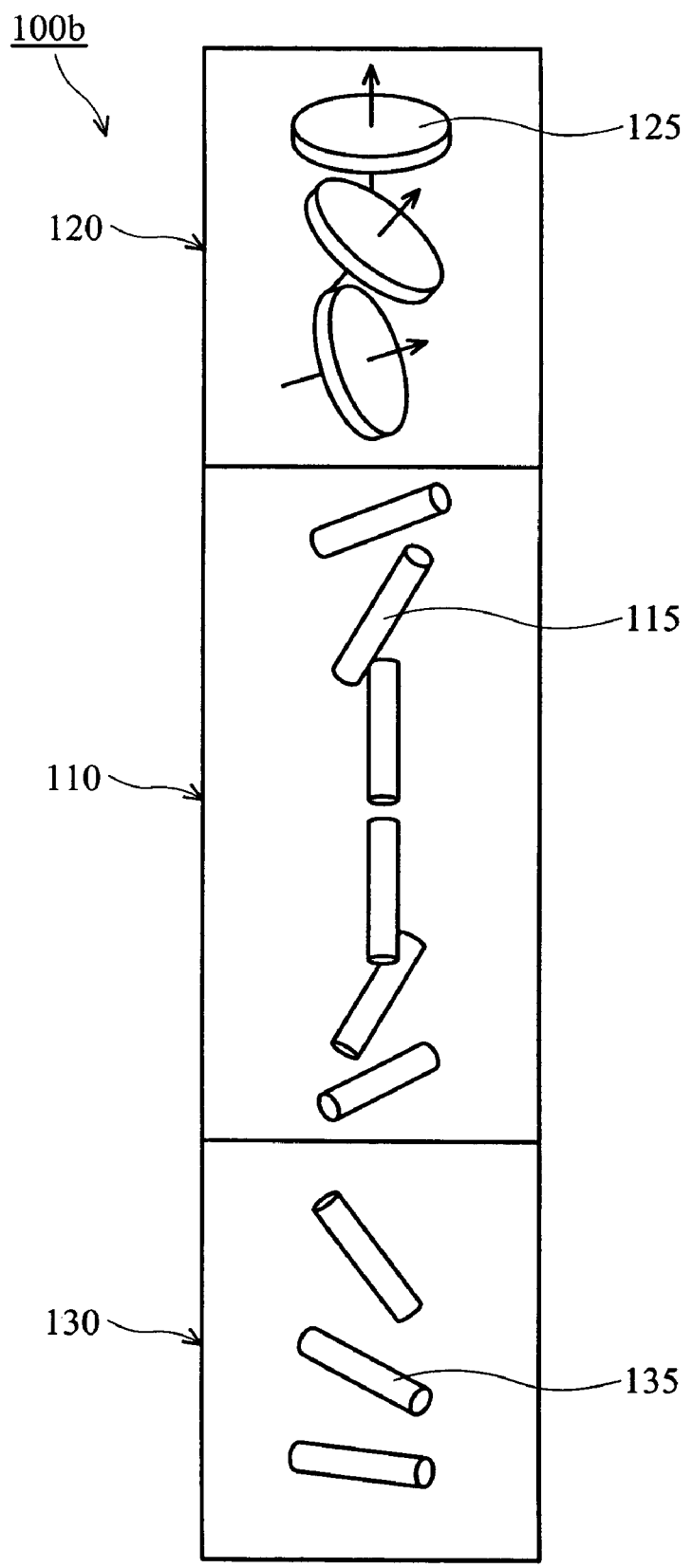
FIG. 4B is a schematic view showing the polarity relationship between compensation films and the liquid crystal layer.

FIG. 4B is a schematic view showing the polarity relationship between compensation films and the liquid crystal film. The compensated liquid crystal uses different birefringence polarity films to compensate for the birefringence of liquid crystal display panel 110. The first compensated film and the second compensated film have different birefringence polarities, the birefringence therebetween can therefore be compensated, thereby widening the viewing angle of a normally white display.

Figure 5:
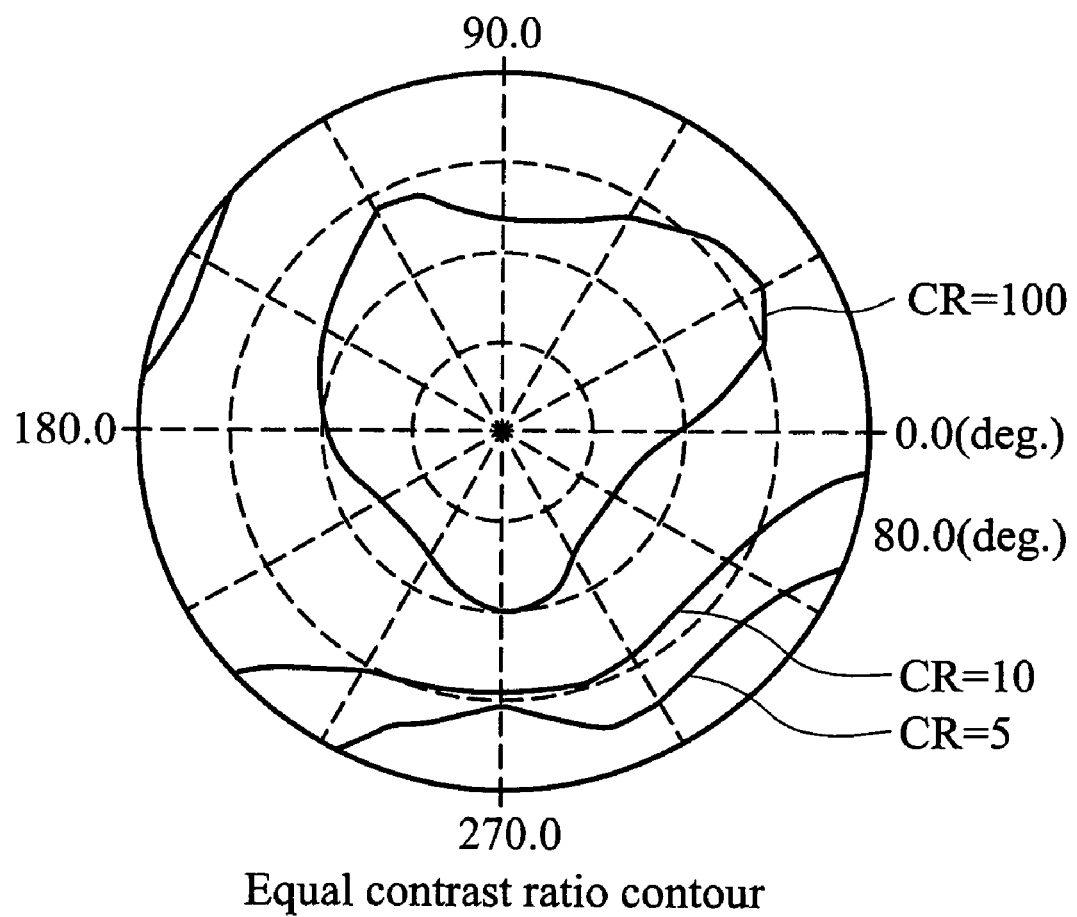
FIG. 5 shows the field of view of a conventional single film compensated liquid crystal display.
Figure 6:
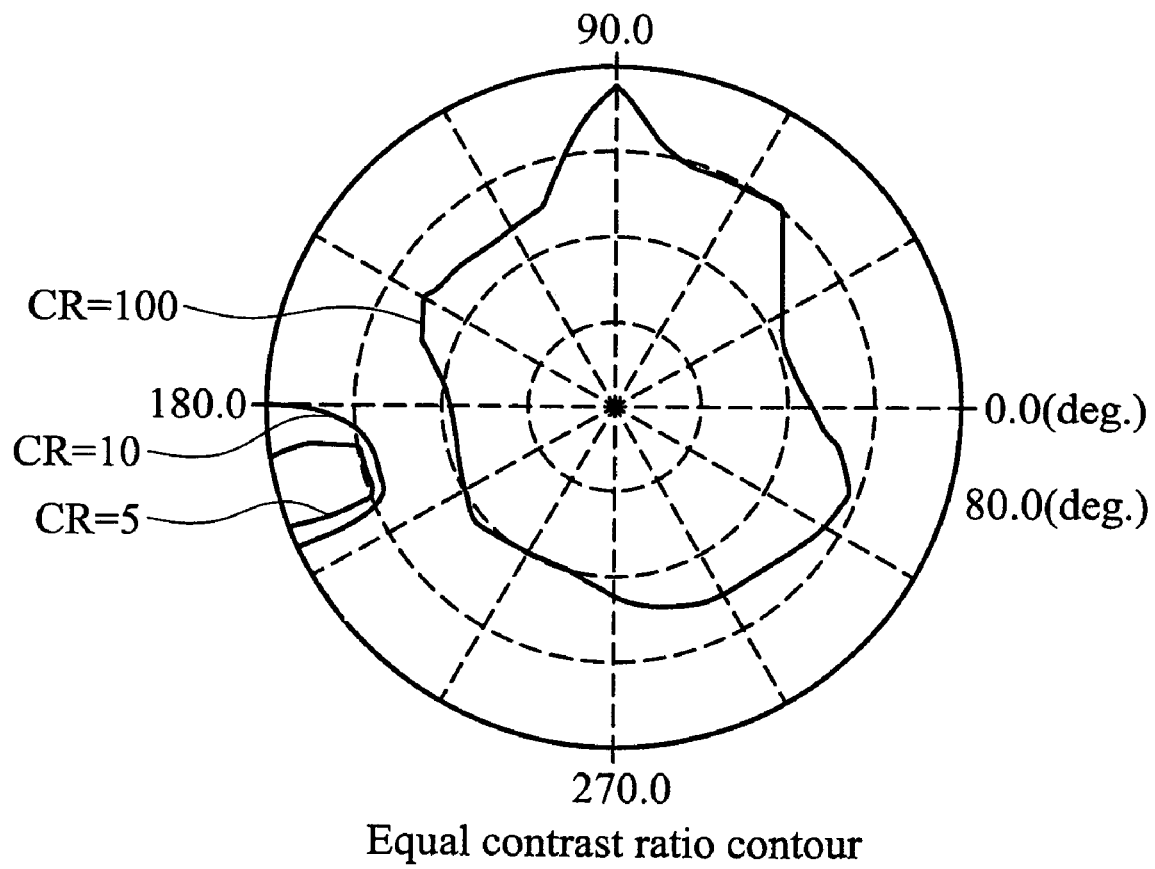
FIG. 6 shows the field of view of an exemplary multi-film compensated liquid crystal display of the invention.

FIG. 5 shows the field of view of a conventional multi-film compensated liquid crystal display. FIG. 6 shows the field of view of an exemplary embodiment of a multi-film compensated liquid crystal display of the invention. Compared with the conventional, the results of the inventive displays, with different compensation film polarity, light leakage decreases and area of contrast ratio (CR) increases. For example, the area of the CR=100 in FIG. 6 is greater than that in FIG. 5, view angles are thus increased.

Figure 7:
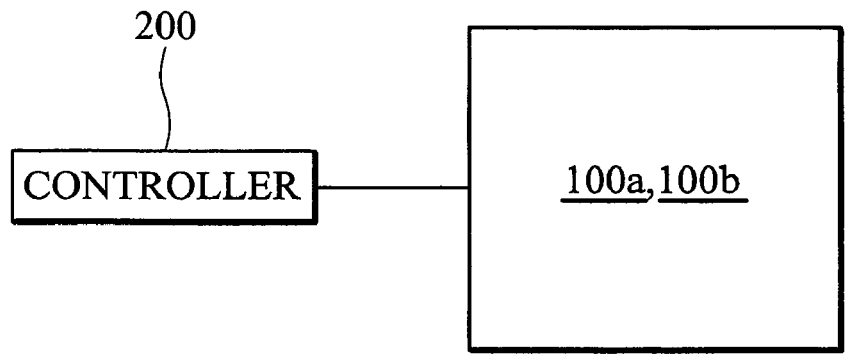
FIG. 7 is a schematic diagram of a system incorporating an embodiment of a display device comprising the multi-film compensated liquid crystal display panel.

FIG. 7 is a schematic diagram of an embodiment of such a system incorporates a display device 300 comprising the multi-film compensated liquid crystal display panel of the invention. The multi-film compensated transmissive liquid crystal display panel 100a or 100b can be coupled to a controller 200, forming a display device 300 as shown in FIG. 7. The controller 300 can comprise a source and a gate driving circuits (not shown) to control the transmissive liquid crystal display panel 100a or 100b to render image in accordance with an input.

Figure 8:
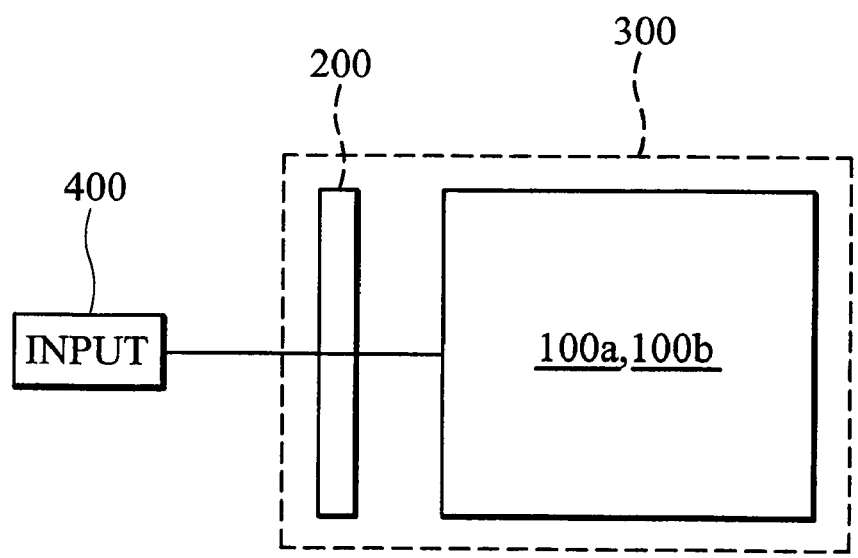
FIG. 8 is a schematic diagram of another system incorporating another embodiment of an electronic device.

FIG. 8 is a schematic diagram of another embodiment of a system, in this case, an electronic device. In FIG. 8, the electronic device 500 incorporates a display device comprising the transmissive liquid crystal display panel of the invention. An input device 400 is coupled to the controller 200 of the display device 300 shown in FIG. 8 can include a processor or the like to input data to the controller 200 to render an image. The electronic device 500 may be a portable device such as a PDA, notebook computer, tablet computer, cellular phone, or a desktop computer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying images comprising:
    a liquid crystal display comprising:
    a first substrate;
    a second substrate;
    a liquid crystal layer sandwiched between the first substrate and the second substrate;
    a first polarizer laminated outside the first substrate opposing the liquid crystal layer;
    a second polarizer laminated outside the second substrate opposing the liquid crystal layer;
    a first compensation film comprising optical axis angles in a range approximately from 24° to 79°, interposed between the first polarizer and the first substrate; and
    a second compensation film comprising optical axis angles in a range approximately from 2° to 52°, interposed between the second polarizer and the second substrate, wherein the first compensation film and the second compensation film comprise different birefringence polarities;
    a ¼λ compensation film and a first ½λ compensation film film interposed between the first polarizer and the first compensation film; and
    a second ½λ compensation film interposed between the second polarizer and the second compensation film.

2. The system as claimed in claim 1, wherein the liquid crystal layer comprises an electrical control birefringence (ECB) liquid crystal.

3. The system as claimed in claim 1, wherein the birefringence Δn of the first compensation film is negative and the birefringence Δn of the second compensation film is positive.

4. The system as claimed in claim 1, wherein the birefringence Δn of the first compensation film is positive and the birefringence Δn of the second compensation film is negative.

5. A system for displaying images comprising:
    a liquid crystal display comprising:
    a first substrate;
    a second substrate;
    a liquid crystal layer sandwiched between the first substrate and the second substrate;
    a first polarizer laminated outside the first substrate opposing the liquid crystal layer;
    a second polarizer laminated outside the second substrate opposing the liquid crystal layer;
    a first compensation film comprising optical axis angles in a range approximately from 24° to 79°, interposed between the first polarizer and the first substrate; and
    a second compensation film comprising optical axis angles in a range approximately from 2° to 52°, interposed between the second polarizer and the second substrate, wherein the first compensation film and the second compensation film comprise different birefringence polarities;
    a first ½λ compensation film interposed between the first polarizer and the first compensation film; and
    a ¼λ compensation film and a second ½λ compensation film interposed between the second polarizer and the second compensation film.

6. The system as claimed in claim 1, wherein the first compensation film comprises disk-like liquid crystal.

7. The system as claimed in claim 1, wherein the second compensation film comprises rod-like liquid crystal.

8. The system as in claim 1, further comprising:
    a controller coupled to the liquid crystal display panel to control the panel to render an image in accordance with an input.

9. The system as in claim 8, further comprising:
    an input device coupled to the controller of the liquid crystal display device to control the display device to render an image.

10. The system as claimed in claim 9, wherein the liquid crystal layer comprises an electrical control birefringence (ECB) liquid crystal.

11. The system as claimed in claim 9, wherein the negative birefringence compensation film comprises disk-like liquid crystal.

12. The system as claimed in claim 9, wherein the positive birefringence compensation film comprises rod-like liquid crystal.

13. The system as claimed in claim 5, wherein the liquid crystal layer comprises an electrical control birefringence (ECB) liquid crystal.

14. The system as claimed in claim 5, wherein the birefringence Δn of the first compensation film is negative and the birefringence Δn of the second compensation film is positive.

15. The system as claimed in claim 5, wherein the birefringence Δn of the first compensation film is positive and the birefringence Δn of the second compensation film is negative.

16. A system for displaying images comprising:
    a liquid crystal display comprising:
    a first substrate;
    a second substrate;

a liquid crystal layer sandwiched between the first substrate and the second substrate;

a first polarizer laminated outside the first substrate opposing the liquid crystal layer;

a second polarizer laminated outside the second substrate opposing the liquid crystal layer;

a negative birefringence compensation film comprising optical axis angles in a range approximately from 24° to 79°, interposed between the first polarizer and the first substrate;

a positive birefringence compensation film comprising optical axis angles in a range approximately from 2° to 52°, interposed between the second polarizer and the second substrate;

a ¼λ compensation film and a first ½λ compensation film interposed between the first polarizer and the negative birefringence compensation film; and a second ½λ compensation film interposed between the second polarizer and the positive birefringence compensation film.

17. A system for displaying images comprising:
a liquid crystal display comprising:
a first substrate;
a second substrate;
a liquid crystal layer sandwiched between the first substrate and the second substrate;

a first polarizer laminated outside the first substrate opposing the liquid crystal layer;

a second polarizer laminated outside the second substrate opposing the liquid crystal layer;

a positive birefringence compensation film comprising optical axis angles in a range approximately from 2° to 52°, interposed between the first polarizer and the first substrate;

a negative birefringence compensation film comprising optical axis angles in a range approximately from 24° to 79°, interposed between the second polarizer and the second substrate;

a first ½λ compensation film interposed between the first polarizer and the positive birefringence compensation film; and a ¼λ compensation film and a second ½λ compensation film interposed between the second polarizer and the negative birefringence compensation film.

18. The system as claimed in claim 17, wherein the liquid crystal layer comprises an electrical control birefringence (ECB) liquid crystal.

19. The system as claimed in claim 17, wherein the negative compensation film comprises disk-like liquid crystal.

20. The system as claimed in claim 17, wherein the positive compensation film comprises rod-like liquid crystal.

* * * * *